United States Patent [19]

Kelly, II

[11] 4,003,653

[45] Jan. 18, 1977

[54] METHOD OF PRODUCING COLOR SLIDES FROM BLACK AND WHITE ORIGINALS

[75] Inventor: James H. Kelly, II, Adams, Mass.

[73] Assignee: General Electric Company

[22] Filed: Mar. 17, 1975

[21] Appl. No.: 558,677

[52] U.S. Cl. .................................... 355/77; 352/87; 355/32; 355/40

[51] Int. Cl.[2] .......................................... G03B 27/32

[58] Field of Search ........... 355/32, 40, 77; 352/85, 352/87

[56] References Cited

UNITED STATES PATENTS

| | | | |
|---|---|---|---|
| 2,232,144 | 2/1941 | Sersen | 355/77 UX |
| 2,927,857 | 3/1960 | Pohl | 355/32 X |
| 3,480,362 | 11/1969 | DeJoux | 355/40 |
| 3,600,087 | 8/1971 | Goodman et al. | 355/77 X |
| 3,619,051 | 11/1971 | Wright | 355/77 X |
| 3,705,762 | 12/1972 | Ladd et al. | 352/87 X |
| 3,741,649 | 6/1973 | Podesta et al. | 355/32 X |
| 3,833,293 | 9/1974 | Serio et al. | 355/32 X |

*Primary Examiner*—Richard A. Wintercorn
*Attorney, Agent, or Firm*—Francis X. Doyle

[57] ABSTRACT

In the method of producing color slides from black and white originals, a light box, a glass plate and a camera are used. Also utilized is a positive and negative of a black and white original. In the first step, a film frame in the camera is exposed to the positive which is between the camera and the light box. Any desired background texture between the positive and the light box and a color filter on the camera lens may be used. In succeeding steps, the negative is used, mounted between the camera and the light box, and various portions of the negative are blacked out and different colored filters used while continuing to expose the film frame in the camera to various portions of the negative.

7 Claims, 6 Drawing Figures

METHOD OF PRODUCING COLOR SLIDES FROM BLACK AND WHITE ORIGINALS

BACKGROUND OF THE INVENTION

This invention relates to the production of color slides and more particularly, to a method of producing color slides from original black and white artwork.

In the presently used means of producing color slides usually the artwork required must be made in the desired colors and a picture taken of such color artwork. As is well understood, this requires the use of highly skilled artists to make the original artwork. The artist must be skilled, especially in the use of various colors in making original artwork. Further, should it be desired to make a similar color slide, but with different colors, it is usually necessary to make a new color original.

It has long been recognized that there is a need in the graphic arts field to provide a simple, inexpensive means for making a variety of color slides without the need for original color artwork. It has recently been discovered that an unlimited variety of color slides can be made from original black and white artwork. This substantially reduces both the time and the expense of making color slides, and completely eliminates the need for original color artwork. As is well understood, many black and white original artworks can be made in a "paste up" manner by the use of normally skilled layout operators, rather than a skilled artist.

It is therefore, a principal object of this invention to provide a method of making color slides from original black and white artwork.

A further object of this invention is to provide a method of making color slides which may utilize a variety of colors and background textures with only a single black and white original.

BRIEF SUMMARY OF THE INVENTION

In carrying out this invention in a preferred form, an original black and white artwork is prepared. A negative of such artwork is made and a positive is made from the negative. Using a light box, a glass plate and a camera, the positive is first exposed to a film frame in the camera, using any desired texture background and any desired color filter. This provides a colored and/or textured background for the slide. Then, using the negative, the same film frame is again exposed using any other desired color filter to provide color to the foreground of the artwork. When desired, various portions of the foreground may be blacked out from the negative during different exposures of the same film frame to provide a variety of colors to the foregound material.

What is new and which it is desired to secure by Letters Patent of the United States will be particularly pointed out and distinctly claimed in the claims appended hereto. However, it is believed that this invention and the manner in which its various objects and advantages are obtained as well as other objects and advantages thereof, will be better understood by reference to the following detailed description of the preferred embodiments particularly when considered with the accompanying drawings.

DESCRIPTION OF PREFERRED EMBODIMENT

In the preferred embodiment of this invention color slides are made by the plural exposure of a film frame to first the positive and then the negative of a picture of black and white original art. Reference will now be made to the drawings in which like numerals are used to indicate like parts throughout the various views thereof for a description of the preferred embodiment.

Figure 1:
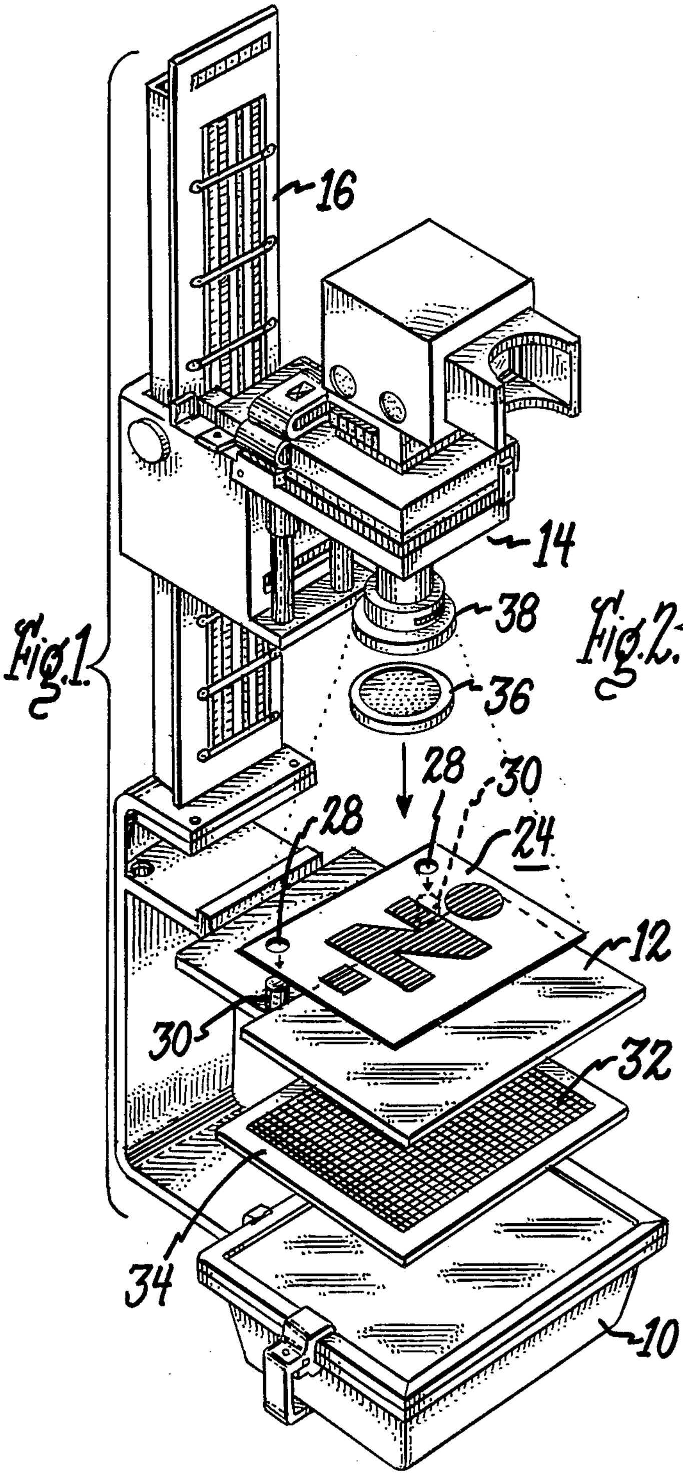
FIG. 1 is an exploded perspective view of the present preferred equipment for making color slides from black and white art according to this invention.

Referring first to FIG. 1, there is shown a perspective exploded view of a layout for performing the method of this invention. FIG. 1 shows a light box 10, a fixed glass plate 12 and a camera 14 mounted on the stand 16. As can be seen in FIG. 1, the light box 10 is secured to the base of stand 16 while glass 12 is mounted on the stand a distance above the light box 10 to provide complete lighting over the area of glass 12. Camera 14 is movably mounted on stand 16 and is moved to a distance above glass 12 to obtain the best view of the artwork placed on the glass plate 12. As will be understood, camera 14 is provided with a film (not shown) suitably for making color slides and has provisions for the multi-exposure of each frame of the film.

Figure 2:
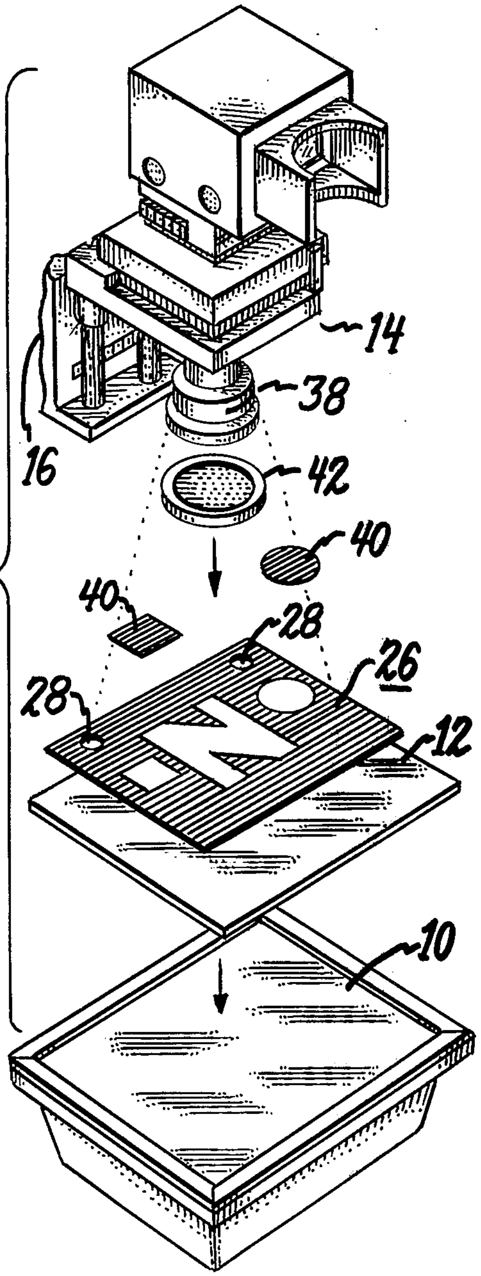
FIG. 2 is an exploded perspective view similar to FIG. 1 showing a further step in the method of this invention.
Figure 3:
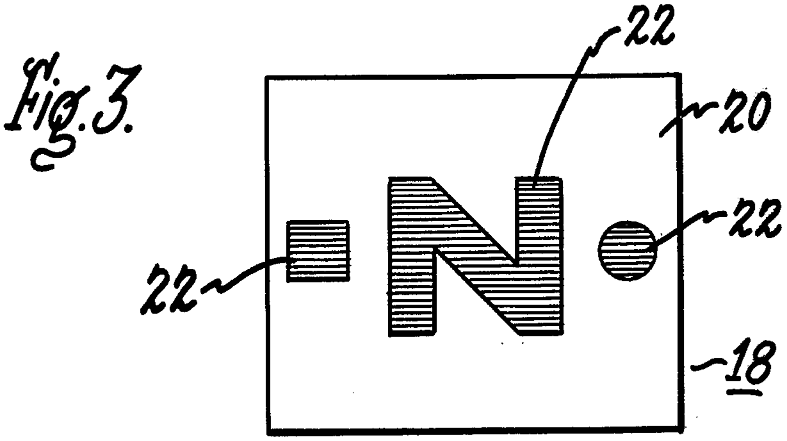
FIG. 3 is a plan view of an original black and white artwork.

For the first step in the process of making a color slide from a black and white original art work, an original black and white is provided such as the black and white art 18 shown in FIG. 3. As will be understood with respect to the black and white art 18, the background 20 is white while the foreground 22, composed of the square, the circle and the letter N, is black. A positive and negative of black and white art 18 is made. The positive, where all the background is clear and the foreground is black, is shown at 24 in FIG. 1. The negative, where all the background is black and the foreground is clear, is shown at 26 in FIG. 2. Both the positive 24 and the negative 26 are provided with identically placed registration holes 28 as is shown in FIGS. 1 and 2.

Figure 4A:
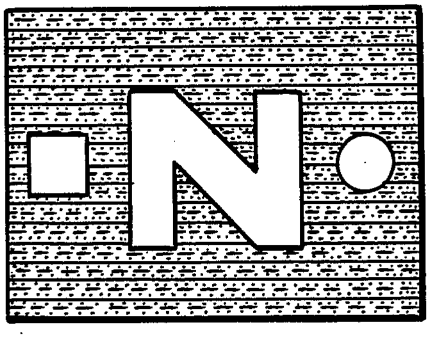
FIGS. 4*a*, *b*, and *c* to show the results of exposing a single film frame to the different steps of this invention in making a color slide.

In the next step, as is shown in FIG. 1, the positive 24 is placed on glass plate 12 with the registration holes 28 placed over the registration pins 30. As can be seen, the registration pins 30 are secured on the frame 16 near the glass plate 12. If desired, a texture background may be provided for the slide by placing a textured screen such as 32 between the light box 10 and the plate 12. In the preferred embodiment, the textured screen 32 is placed on a second glass plate 34 which is mounted on the frame or stand 16 between the light box 10 and the glass plate 12. The background color for the slide is provided by means of a color filter 36 which is placed over the lens 38 of the camera 14. As will be understood, a polorizing filter (not shown) is usually provided in lens 38 to block out glare. With the light box 10 illuminated and the screen 32, the positive 24 and the filter 36 in place, the film frame (not shown) in the camera 14 is exposed. This would provide an exposed film such as is shown in FIG. 4*a*, where the background would be provided with a texture from the screen 32 and a color from the filter 36. As will be understood, the foreground, composed of the square, the circle and the N, would be clear since these areas had not been exposed.

Figure 4B:
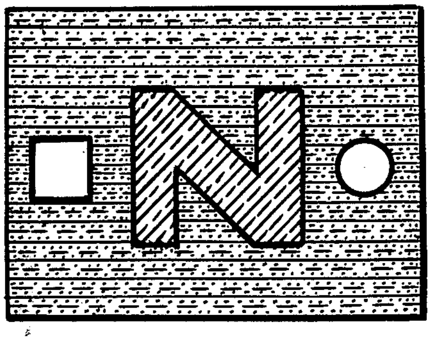

The next step in the method is shown in FIG. 2. The positive 24 is removed and the negative 26 placed on glass plate 12 with registration holes 28 over registration pins 30. As will be understood, this will place the negative 26 in the exact position previously occupied by the positive 24. In the step indicated in FIG. 2, blackouts 40 are placed over the square and the circle of negative 26. The screen 32 has been removed and another color filter 42 is placed over lens 38. With the light box 10 illuminated and the negative 24, blackouts 40 and filter 42 in place, the film frame in camera 14 is again exposed. This would provide an exposed film such as is shown in FIG. 4*b*. Since only the N was exposed, the film would provide the colored and textured background of FIG. 4*a* and the color to N of the filter 42. The circle and the square would still be clear since they had not been exposed.

Figure 4C:
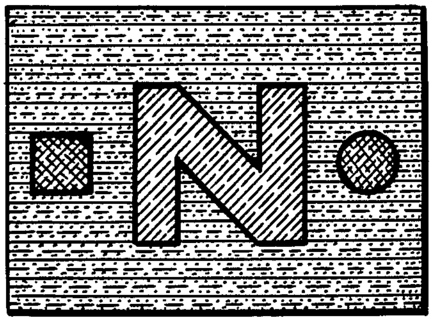

In the following step a blackout would be provided over N (not shown) and the blackouts 40 removed from the square and the circle. Another color filter would be provided and the film frame in camera 14 again exposed. This would provide the film color slide as shown in FIG. 4*c*. As can be seen the color slide is provided with the color and texture background as in 4*a*, the N colored as in 4*b* while the square and the circle are colored from the filter of the last film exposure.

From the above description it will, of course, be clear that by use of blackouts and color filters the foreground of the negative 26 may be provided with as many alternating colors as is desired. Of course, it will be clear that the use of the textured screen 32 is optional; but provides an additional means of highlighting the background of colored slides.

In the preferred embodiment set forth in FIG. 1, the light box 10 is provided with two daylight type light bulbs, which provides substantially even illumination over the entire surface. The special daylight type light bulbs are rated at 5000° K. The film utilized was a daylight high speed film carrying the designation — Kodak EH 135. A constant exposure was used with the lens set at f-11 with the shutter speed at one second. In the layout shown in FIG. 1, and using a 6 inch × 9 inch art, the distance between glass 12 and lens 38 was 15 inches. This was found to give the best focus of the art. Also, the glass 12 was placed 9½ inches above the light box 10.

The above layout has been utilized using a light box having two 40w. fluorescent lights. However, when such light box is used it is generally necessary to provide a light diffusing surface over the light box such as, for example, two sheets of CFM-4 Mylar. Also, it is considered desirable with such light box to provide a FLD fluorescent filter in order to utilize the high speed daylight film. Without the fluorescent filter, a film designated — Kodak EHB was used with the lens opening again at f-11 and the shutter speed at four seconds. Obviously, the opening could have been wider to therefore shorten the shutter speed. However, it is believed that the best resolution is obtained at an opening of f-11.

In some instances, it has been found desirable to use color paper strips on the negative. Where a plurality of lines are used, such as in graphs, it has been found advantageous to use various color paper strips over various lines, black out the rest of the foreground and then expose the film frame using a clear lens. This provides the color to the film frame from the various strips of paper. Other variations will also occur to those skilled in this art.

While there has been shown and described the present preferred embodiment, it will of course, be understood by those skilled in the art that various modifications may be made in the method hereinbefore set forth. For example, it will be understood that it is not necessary that the background using the positive be made prior to the foreground. Obviously, it would be possible to interchange the steps of using the positive and the negative without departing from the spirit and scope of the invention.

What is claimed as new and which it is desired to secure by Letters Patent of the United States is:

1. A method of making a color slide from a black and white original comprising the steps of a. providing a positive and a negative of the black and white original
b. placing said positive between a light box and a camera
c. placing a color filter on the lens of said camera
d. exposing a film frame in said camera to said positive
e. removing said positive and placing said negative between said light box and said camera
f. providing another color filter to said camera lens
g. exposing the same film frame to said negative whereby a color slide is provided having one color of background and a second color of foreground.

2. A method of making color slides as set forth in claim 1, in which the steps of using said positive and said negative of the original artwork is reversed.

3. A method of making color slides as set forth in claim 1, in which portions of said negative are blacked out for one exposure and other portions of said negative are blacked out for another exposure.

4. A method of making color slides as set forth in claim 1, in which color paper strips are placed on portions of said negative and said negative is exposed to said film frame through a clear lens.

5. A method of making a color slide from a black and white original comprising the steps of a. providing a positive and a negative of the black and white original
b. providing a frame member with a light box mounted thereon
c. providing a glass plate secured to the frame in front of said light box
d. providing a camera mounted on said frame beyond said glass plate
e. placing said positive on said glass plate
f. placing a color filter on the lens of said camera
g. exposing a film frame in said camera to said positive
h. removing said positive and placing said negative on said glass plate
i. providing another color filter to said camera lens
j. exposing the same film frame to said negative whereby a color slide is provided having a colored background of the color filter in step (f) and a colored foreground of the color provided in the filter of step (i).

6. A method of making color slides as set forth in claim 5, in which the steps of using said positive and said negative of the original artwork are reversed.

7. A method of making a color slide as set forth in claim 5, in which said positive and said negative are provided with registration holes and registration pins are provided on said frame near said glass plate.

* * * * *